(12) United States Patent
Ruszowski

(10) Patent No.: US 6,761,304 B2
(45) Date of Patent: Jul. 13, 2004

(54) HEATING HEAD FOR SOLDERING AND DE-SOLDERING OF SMD COMPONENTS

(76) Inventor: Czeslaw A. Ruszowski, 428 N. Irving Ave., Scranton, PA (US) 18510

( * ) Notice: Subject to any disclaimer, the term of this patent is extended or adjusted under 35 U.S.C. 154(b) by 132 days.

(21) Appl. No.: 10/006,802

(22) Filed: Nov. 13, 2001

(65) Prior Publication Data

US 2002/0084307 A1 Jul. 4, 2002

(51) Int. Cl.[7] .................. B23K 31/00; B23K 28/00; B23K 1/00; H05B 3/02
(52) U.S. Cl. .............. 228/180.21; 228/51; 228/20.5; 228/6.1; 228/6.2; 228/42; 228/20.1; 228/264; 219/227; 219/228; 219/229
(58) Field of Search .............. 228/51–55, 264, 228/20.1, 20.5, 119, 6.1, 6.2, 9, 180.1, 180.21, 180.22; 219/200, 221, 227, 229; 392/383–385; 126/226, 236–240

(56) References Cited

U.S. PATENT DOCUMENTS

| | | | | |
|---|---|---|---|---|
| 4,133,301 A | * | 1/1979 | Fujiwara ..................... 126/413 |
| 4,295,596 A | * | 10/1981 | Doten et al. ........... 228/180.21 |
| 4,358,662 A | * | 11/1982 | Cranor et al. ................ 219/230 |
| 4,528,746 A | * | 7/1985 | Yoshimura .................... 29/743 |
| 4,564,135 A | | 1/1986 | Barresi ........................ 228/6.2 |
| 4,752,025 A | * | 6/1988 | Stach et al. ..................... 228/9 |
| 4,767,047 A | | 8/1988 | Todd ............................ 228/6.2 |
| 4,787,548 A | | 11/1988 | Abbagnaro ................. 228/6.2 |
| 4,799,617 A | * | 1/1989 | Friedman ............... 228/180.21 |
| 4,805,827 A | | 2/1989 | Coffman ...................... 228/20 |
| 4,858,820 A | | 8/1989 | Kent ........................... 228/264 |
| 4,920,951 A | * | 5/1990 | Le Marchand et al. ..... 126/403 |
| 4,965,433 A | * | 10/1990 | Hanke et al. ................ 219/230 |
| 4,972,990 A | * | 11/1990 | Abbagnaro et al. ........ 228/20.1 |
| 5,054,106 A | * | 10/1991 | Fortune ....................... 392/476 |
| 5,054,681 A | * | 10/1991 | Kim ............................ 228/191 |
| 5,147,081 A | * | 9/1992 | Kim ............................. 228/51 |
| 5,241,156 A | * | 8/1993 | Wallgren et al. ............ 219/233 |
| D352,877 S | * | 11/1994 | Chuang et al. ............. D8/29.1 |
| 5,380,982 A | | 1/1995 | Fortune ....................... 219/230 |
| 5,419,481 A | | 5/1995 | Lasto et al. .................. 228/6.2 |
| 5,579,979 A | * | 12/1996 | Kurpiela ...................... 228/6.2 |
| 5,785,237 A | | 7/1998 | Lasto .................... 228/180.22 |
| 5,826,779 A | * | 10/1998 | Jacks et al. ................... 228/42 |
| 5,890,646 A | * | 4/1999 | Tang et al. ............ 228/180.21 |
| 5,915,955 A | * | 6/1999 | Lin .............................. 431/344 |
| 6,059,170 A | | 5/2000 | Jimarez ....................... 228/119 |
| 6,105,847 A | * | 8/2000 | Kim ............................. 228/6.2 |
| 6,127,656 A | * | 10/2000 | Kilmer et al. .............. 219/227 |
| 6,131,791 A | | 10/2000 | Masaki ........................ 228/4.1 |
| 6,182,884 B1 | * | 2/2001 | Ma et al. ..................... 228/119 |
| 6,189,812 B1 | * | 2/2001 | Buridant ..................... 239/423 |
| 6,196,439 B1 | | 3/2001 | Mays et al. .................. 228/6.2 |
| 6,201,930 B1 | * | 3/2001 | Close et al. ................. 392/379 |
| 6,220,503 B1 | | 4/2001 | Cox ............................. 228/265 |
| 6,223,968 B1 | | 5/2001 | Gabriel et al. .............. 228/6.2 |
| 6,257,478 B1 | | 7/2001 | Straub ......................... 228/6.2 |
| 6,474,530 B1 | * | 11/2002 | Hodil et al. ................... 228/42 |

* cited by examiner

Primary Examiner—Lynne Renee Edmondson
(74) Attorney, Agent, or Firm—Charles A. Wilkinson; Clinton H. Wilkinson

(57) ABSTRACT

A heating head for soldering and de-soldering surface mount devices (SMD's) using hot inert gas or air is comprised of a handle in which there is placed a heater sub-assembly on which there is secured a quick connect mechanism for mounting a heating nozzle. The heater sub-assembly is enclosed in a shroud and is secured to the end of the handle by a thermal insulating ring, such shroud housing a ceramic rod having elongated bosses on which a heating element is secured, while a laminar flow equilizer is used to provide more uniform gas flow across the heating element. Quick connect mechanism is secured to the heater sub-assembly shroud and uses a spring loaded winged locking mechanism to the secure heating nozzles to the heater head. In one embodiment, the heating nozzles have a truncated pyramid shaped chamber to which individual end nozzles are attached for directing gas flow.

37 Claims, 10 Drawing Sheets

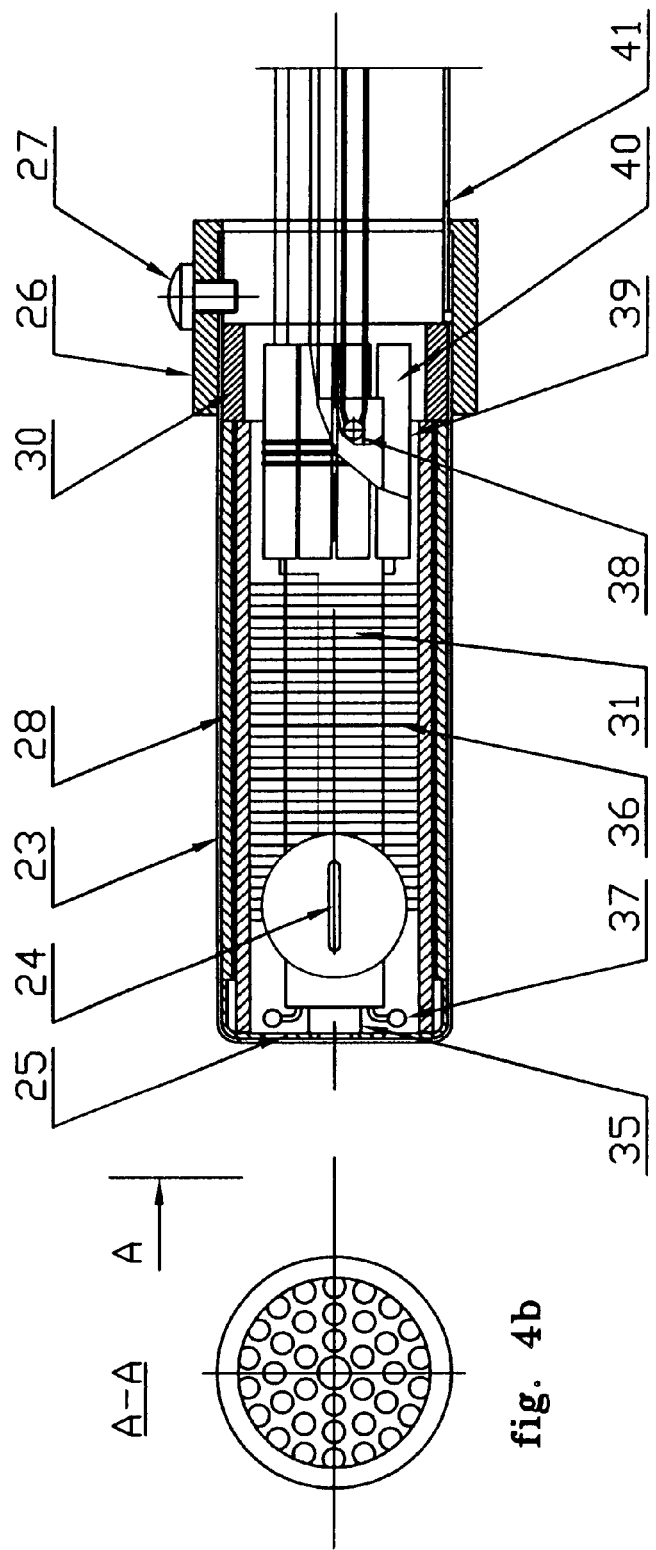

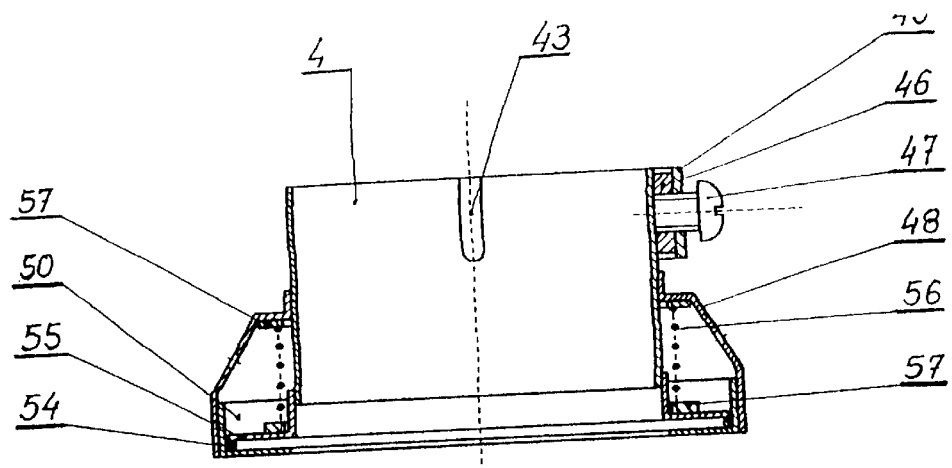
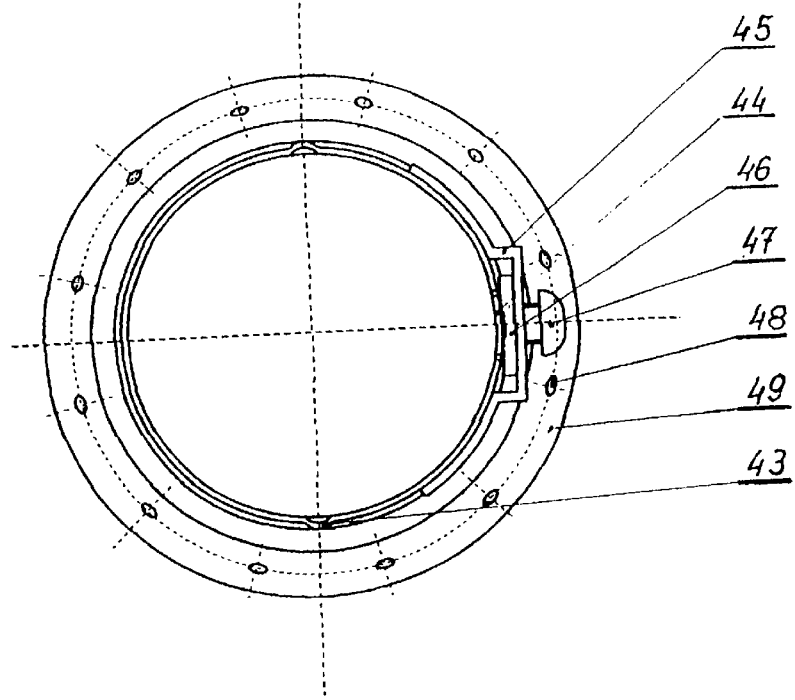
fig. 6b

HEATING HEAD FOR SOLDERING AND DE-SOLDERING OF SMD COMPONENTS

CROSS REFERENCE TO RELATED APPLICATIONS

Applicant claims benefit to Polish Patent No. W-111548 filed on Nov. 13, 2000 and Polish Patent No. W-111661 filed on Dec. 12, 2000, both of which are hereby incorporated by reference.

BACKGROUND OF THE INVENTION

1. Field of the Invention

The present invention relates generally to soldering and desoldering of SMD components, and more specifically to a heating device having a novel hot gas flow arrangement, nozzle attachment mechanism, and end nozzle design for soldering and desoldering solid state devices through utilization of a stream of hot neutral gas.

2. Description of the Prior Art

The subject of this patent is a heating head for soldering and de-soldering of SMD components using a hot neutral gas or air stream.

Numerous hot gas type soldering/desoldering machines are known for attaching and removing electronic components from a printed circuit board (PCB). One known solution is described by Polish Patent (# Ru-54524), in which a heating nozzle placed at the end of a heating device for dispersing a hot gas (air) is comprised of a round shroud in the form of a sliced cone. Situated in the shroud on one side is a threaded hole, while on the other side there is a round plate in which two or four narrow elongated holes are situated, distributed in parallel to the shape of the square or rectangle, in the case of 2 holes, or two parallel pairs perpendicular one to each other in the case of 4 holes, and in the middle there is one round hole. Discharge nozzles are fastened in the elongated holes, which are equipped with protruding directional flaps or end fittings. In the above solution, the discharge nozzles have a different construction applicable to a different type of solid state devices.

Also known are other designs of heater end nozzles or end fittings, in which the discharge nozzles have a conical shape, flattened at the bottom, made of thin wall tubing formed by a complicated multitask method of plastic forming coupled with thermal forming. In this type of end fittings, good parameters of working gas are achieved. However, due to the complicated production process, they are expensive. Furthermore, the above-described solution applies to only one element of a heating head. End nozzles have the same cross-section on their entire lengths. The shape of the shroud and the end nozzles has a direct effect on the parameters of the hot gas (air). In the previous solutions, there is too big a difference between the temperature of the hot gas in the middle and at both ends of the end nozzles.

There are also known other configurations of nozzles in which the end nozzles have a conical shape and are flattened at the ends. Such nozzles are made of a thin wall tubing formed by a compacted, multitasking forming process including hot forming. In such nozzles, the parameters of the hot gas for soldering are good, but because of the nature of the nozzle production process, they are also very expensive.

Another solution is known from Polish patent # Ru-54524, in which the electrical heater is comprised of a cylindrical ceramic shroud. Such shroud is enclosed on both ends with perforated end cups having centrally located holes to mount to the heater core in a shape of a cylinder with a centrally located hole and additional holes on the perimeters for electrical wires. The shroud, end cups and heater rod are made of an insulative material such as ceramics or quartz glass, and the shroud is inside the cylindrical thin wall tube made of an insulation material such as mica. The above solution concerns another element of the heating head, and is the predecessor of the solution presented in this application. This predecessor does not have characteristics concerning construction of the entire heating head.

There are also known solutions for complete heating heads. They are comprised of the handle, heater assembly, fast connecting mechanism, and nozzle. However, the parts of such prior heating heads make the usefulness of a complete head less practical and useful. For example, electrical supply and control wires and air lines are attached to the handle at the end of the handle along the axis of the heating head. This causes cumbersome cable pull sideways during hand held operations. In addition, the heater is placed inside the handle, which often causes overheating and shortens life of the device.

Reference is also made to the following prior art patents:

U.S. Pat. No. 4,295,596 issued to B. O. Doten et al. on Oct. 20, 1981, entitled "METHODS AND APPARATUS FOR BONDING AN ARTICLE TO A METALLIZED SUBSTRATE," discloses a hot gas type soldering/desoldering device wherein hot gas can be directed substantially parallel to the surface of a printed circuit board by angled deflectors on the end of the heater nozzle. Doten et al. is illustrative of the fact that many early prior art nozzles were held to the heater body by bolts and therefore could not be quickly attached or removed therefrom.

U.S. Pat. No. 4,564,135 issued to A. J. Barresi et al. on Jan. 14, 1986, entitled "CHIP CARRIER SOLDERING TOOL," discloses a nozzle for soldering/desoldering electronic components which diverts most of the hot gas flow to the periphery of the component, although not in the same manner as the present invention.

U.S. Pat. No. 4,767,047 issued to R. I. Todd et al. on Aug. 30, 1988, entitled "DESOLDERING DEVICE," discloses a hot gas type desoldering device having a suction device for lifting a circuit from a circuit board. However, such solution discloses none of the specific improvements of the present invention.

U.S. Pat. No. 4,787,548 issued to L. A. Abbagnaro et al. on Nov. 29, 1988, entitled "NOZZLE STRUCTURE FOR SOLDERING AND DESOLDERING," discloses an adjustably positionable nozzle for a soldering/desoldering tool having a means for uniformly distributing heated air through the nozzle. However, such reference teaches a different nozzle structure, and the nozzles are attached to the soldering device by holes or bores which receive screws, which task is time consuming and inconvenient. Also see U.S. Pat. Nos. 4,899,920 and 4,972,990 issued to Abagnaro et al.

U.S. Pat. No. 4,805,827 issued to B. W. Coffman et al. on Feb. 21, 1989, entitled "METHOD OF SOLDERING WITH HEATED FLUID AND DEVICE THEREFOR," discloses a nozzle for a hot gas soldering device having a horizontal baffle member which directs the gas laterally to the sides of the nozzle, and then downwardly to the sides of an electronic component. While laterally deflecting the gas while in the nozzle apparently mixes the air so that when it is directed across the component it has a more uniform temperature, such solution does not increase the uniformity of the gas flow from the heater head through the nozzle and across the electronic component as in the present system.

U.S. Pat. No. 4,858,820 issued to G. M. Kent on Aug. 22, 1989, entitled "DESOLDERING AID AND METHOD,"

discloses a cap-like nozzle desoldering attachment. The Kent nozzle is primarily designed to desolder older electronic components wherein the leads extend from the sides of the component, rather than the more modern BGA type components.

U.S. Pat. No. 5,380,982 issued to W. S. Fortune on Jan. 10, 1995, entitled "METALLIC CONDUCTION—HOT GAS SOLDERING—DESOLDERING SYSTEM," discloses a hot air type system which can be used with a tip designed for desoldering an SMD device. However, Fortune does not teach a suction cup on the end of the vacuum tube or a nozzle structure for uniformly distributing such hot air.

U.S. Pat. No. 5,419,481 issued to C. S. Lasto et al. on May 30, 1995, entitled "PROCESS AND APPARATUS FOR ATTACHING/DETACHING LAND GRID ARRAY COMPONENTS," discloses another soldering/desoldering nozzle for BGA, as well as SGA and CGA type electronic components. While the gas flow inlet and exhaust flow patterns created by the nozzle result in a continuous flow and apparently more uniform solder melting, Lasto et al. does not attempt to provide a more uniform flow through the heater head as in the present invention.

U.S. Pat. No. 5,579,979 issued to G. Kurpiela on Dec. 3, 1996, entitled "SOLDERING/DESOLDERING NOZZLES FOP SMD'S," discloses an improved heating nozzle having slotlike recesses along its bottom periphery through which hot gas is directed at the leads of an electronic component. Such nozzle includes vent holes to allow for circulation of the has gas across the leads; however, such vent holes are situated on the corners of the nozzle rather than slightly spaced from the corners as in the present inventor's arrangement.

U.S. Pat. No. 5,785,237 issued to C. S. Lasto et al. on Jul. 28, 1998, entitled "DIFFERENTIAL MULTI-FLOW CONTROL NOZZLES APPARATUS AND PROCESS," discloses an improved hot gas-type nozzle which apparently allows for more uniform heating and decreases the reflow cycle time by directing the entire gas flow against the top surface of the leads, causing heat to conduct through the leads and melt the solder on the underside of the component.

U.S. Pat. No. 5,890,646 issued to A. Q. Tang et al. on Apr. 6, 1999, entitled "SOLDERING/DESOLDERING APPARATUS WITH SPRING-LOADED FLOATING VACUUM PICKUP DEVICE," discloses a soldering/desoldering apparatus having a vacuum pickup connected to a spring-loaded control on the handle of the apparatus. Manual pressure on a slide rod allows the height of the pickup tube and suction device to pick up and remove components during desoldering, although the spring-loaded control differs from the present vacuum tube control system, which is not spring loaded.

U.S. Pat. No. 6,059,170 issued to L. J. Jimarez on May 9, 2000, entitled "METHOD AND APPARATUS FOR INSULATING MOISTURE SENSITIVE PBGA'S," discloses a soldering/desoldering device wherein a temperature shield covers the electronic component during soldering/desoldering, particularly for plastic ball grid array (PBGA) devices. While Jimarez teaches a state-of-the-art nozzle, such nozzle does not disclose any of the major features of the present invention.

U.S. Pat. No. 6,105,847 issued to Y. Kim on Aug. 22, 2000, entitled "NOZZLE STRUCTURE OF REPAIR APPARATUS FOR SEMICONDUCTOR PACKAGE," teaches another nozzle solution for a desoldering device, the main difference from prior nozzles being that the exhaust flow is better directed upwardly away from adjacent electronic components.

U.S. Pat. No. 6,131,791 issued to H. Masaki on Oct. 17, 2000, entitled "SOLDERING AND DESOLDERING DEVICE WITH IMPROVED PICKUP DEVICE," discloses a handheld hot gas soldering/desoldering device having a vacuum pickup tube adjustment control on the handpiece portion of the device for raising and lowering the vacuum pickup tube. The Masaki vacuum tube control also includes a spring to absorb excess force on the knob which might damage the electronic component being moved or held, while the present system does not include any such spring mechanism.

U.S. Pat. No. 6,182,884 issued to W. M. Ma et al. on Feb. 6, 2001, entitled "METHOD AND APPARATUS FOR REWORKING CERAMIC BALL GRID ARRAY ON CERAMIC COLUMN GRID ARRAY ON CIRCUIT CARDS," discloses an improved nozzle for a soldering/desoldering device having a resilient member affixed to a support member upon which an electronic component rests. The component presses against the resilient member during soldering so that the lower portion of the solder ball array is situated slightly below the lower end of the nozzle, so that when the chip is placed on the circuit board the resilient means exerts a downward pressure on the chip so that it is evenly secured to the board even if the board is slightly warped.

U.S. Pat. No. 6,196,439 issued to A. T. Mays et al. on Mar. 6, 2001, entitled "METHOD AND APPARATUS FOR uBGA REMOVAL AND REATTACH," discloses a soldering/desoldering device nozzle and apparatus wherein heat is provided via conduction of heat through the electronic device rather than through convection of gas.

U.S. Pat. No. 6,220,503 issued to W. L. Cox et al. on Apr. 24, 2001, entitled "REWORK AND UNDERFILL NOZZLE FOR ELECTRONIC COMPONENTS," discloses a desoldering nozzle having an outer tube that provides a gas tight seal around the electronic component, an inner shaft attached to the outer tube by baffles, forming ducts, and a water vapor port. Such water vapor is apparently added to the gas to increase its overall heat capacity. A reversing valve is also used to control the direction of flow of gas and water vapor, thereby providing more uniform heating or reflowing of the solder ball connections.

U.S. Pat. No. 6,223,968 issued to C. F. Gabriel et al. on May 1, 2001, entitled "SOLDER BONDING/DEBONDING NOZZLE INSERT," discloses a nozzle having an insert attached to its lower end that allows the size of the bottom opening to be adjusted, with different inserts fitting different sizes of components. While one using the Gabriel arrangement does not have to have switch to a completely different nozzle structure for each different electronic component, such arrangement is not similar to the present inventor's nozzle structure.

U.S. Pat. No. 6,257,478 issued to J. Straub on Jul. 10, 2001, entitled "SOLDERING/UNSOLDERING ARRANGEMENT," discloses a soldering/desoldering device having a "bell-shaped" nozzle such that heated gas flows downwardly through spaces around the edge of the nozzle and across the electronic component, and then exits upwardly into the nozzle through exhaust valves or ports. A heat distribution plate allows heat to radiate downwardly and more uniformly onto the electronic component than in previous designs.

While each of such solutions has its own advantages and uses, the prior art does not teach a heater wherein hot gas is passed uniformly both across the heating element and through the heating nozzles as in the present system, which results in a much smaller difference in temperature of the hot gas in different areas of the nozzle, and therefore results in more uniform heating and soldering/desoldering of electronic components. In addition, manufacture of the present system is more economical and efficient than previous solutions.

SUMMARY OF THE INVENTION

The present heating head is comprised generally of a handle portion, heater assembly, nozzle connecting mechanism, and heater nozzle. On the upper end of the handle there is an oval like surface angled with respect to the axis of the handle. The handle housing is made in two halves of high temperature thermoset, anti-static plastic having a groove and matching tongue, i.e. clam style housing. Situated on the angled surface there are inlets for gas and electrical connections via an anti-static, multi-wire, flexible cable inside of which there are wires of different gauges. The gas supply is supplied through an anti-static silicon tubing, while also included is a small diameter vacuum line. Inside the handle is a mechanism for laterally moving a metal vacuum tube, which tube extends through the heater sub-assembly and heating nozzle. Attached to the lower end of the metal vacuum tube is a vacuum cup made conveniently from high temperature silicon. The vacuum cup is in the shape of a caved-in dome with a central hole in which a stopping ring/washer is molded, thereby preventing the vacuum tube from inadvertently protruding through the vacuum cup.

The heater sub-assembly is held to the handle via an insulation ring, which also limits heat transfer to the handle. The lower end of the handle to which the heater sub-assembly is attached has a protective, perforated shroud with elongated ventilation holes. The heater sub-assembly is comprised of a thin wall metal tubing shroud having a pair of outwardly protruding press-outs close to its lower end and having a perforated end cup over the same end. Located just inside the shroud is an insulative (artificial mica) tube, while just inside said insulative tube is another high temperature insulative tube (quartz glass or ceramic). Inside the second insulative tube there is a resistive heater which is wound on a ceramic core in the shape of a cylinder and having elongated bosses on its perimeter along the axis. The ceramic core also has an undercut at the end closest to the perforated shroud end cup, with one or two thermocouples for sensing the temperature of the hot air or gas placed in such undercut. On the elongated bosses there is wound a heating element. Behind the heating coil there is a flow equalizer made of ceramic tubing, which equalizes the flow of gas through the heater assembly. At the back of the heating core there is another thermocouple for sensing the temperature along the back of the heater. A grounding wire is permanently attached on the inner side of the metal heater shroud.

A mechanism for quickly connecting and disconnecting a heater nozzle to the heater head is additionally provided. Such mechanism is comprised of a cylindrical shroud with two press-in's corresponding to the press outs on the heater shroud, which is slid over the end of the heater shroud. A perpendicular bar with a threaded hole or PEM-nut and a screw to secure the cylindrical part of the connecting mechanism to the heater shroud via a tong cut in such cylindrical part is spot welded (glued or brazed) to the outer surface of such cylinder. Below on the cylindrical part of the quick change connecting mechanism is an outside mechanism cover, which is cylindrical at the bottom and conical at the top. Attached to the lower portion of the cover is an upper ring having a minimum of two and up to four wings, each of said wings having upwardly facing indents in them. Located inside the mechanism cover is a flanged moving ring which is slid over the cylindrical part of the quick connecting mechanism. Such moving flanged ring is pressed against the wings by the force of a high temperature spring preferably made out of a highest grade high temperature steel alloy.

The wings of the upper ring of the quick connecting mechanism are matched with similar wings on the heating nozzles. In one embodiment, each heating nozzle is generally comprised of a chamber disposed at the end of a connecting cylinder. Such chamber has the shape of a truncated pyramid with a square bottom cover. Centrally located on such bottom cover is a round hole through which the metal vacuum tube protrudes, as well as usually two or four symmetrically located (versus the central hole) rectangular openings in which there are placed end nozzles made conveniently out of bent, thin, stainless steel sheet metal. Such end nozzles are generally wider at the end protruding out of the bottom of the truncated pyramid and narrower at the end nozzle ends. The inner walls of the end nozzles are parallel to the nozzle axis and have a preformed overlap. However, the outer walls of the end nozzles are not parallel to the axis of the nozzle, and are generally angled inward. In addition, such outer walls are also longer than other end nozzle walls. The longer parts are either straight or bent outwards to direct the air flow as required. In another embodiment, the end nozzles are generally in the shape of a rectangular box or chamber, the dimensions of which depend on the type of SMT device. The box is created by folding a thin sheet metal cut out. Circulation holes are centrally located on each side wall, while circulation cut-ins are located along the bottom edge of the each side wall near the corners of the chamber.

BRIEF DESCRIPTION OF THE DRAWINGS

FIG. 4a is a cross-sectional view of the heater sub-assembly of the present invention, with a close-up view of the preformed out-dents or ridges on the outer surface of the heater assembly shown superimposed on the figure in a small circle;

FIG. 4b is a front view of the heater sub-assembly shown in FIG. 4 showing the end cup or grill on such assembly;

FIG. 5a is a cross-sectional view of the heater core of the heater sub-assembly shown in FIG. 4a;

FIG. 6a is a cross-sectional view of a nozzle quick connect mechanism in accordance with the present invention;

FIG. 6b is a top view of the nozzle quick connect mechanism shown in FIG. 6a;

FIG. 7a is a cross-sectional view of the ring portion of the quick connect mechanism shown in FIG. 6a;

FIG. 7b is a top view of the ring portion shown in FIG. 7a;

FIG. 8b is a bottom view of the heating nozzle shown in FIG. 8a.

FIG. 9a is a partial cross-sectional view of the end nozzle ring of the heating nozzle shown in FIG. 8a;

FIG. 9b is a top view of the ring portion of the heating nozzle shown in FIG. 9a.

DETAILED DESCRIPTION OF THE INVENTION

The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention.

Figure 1:
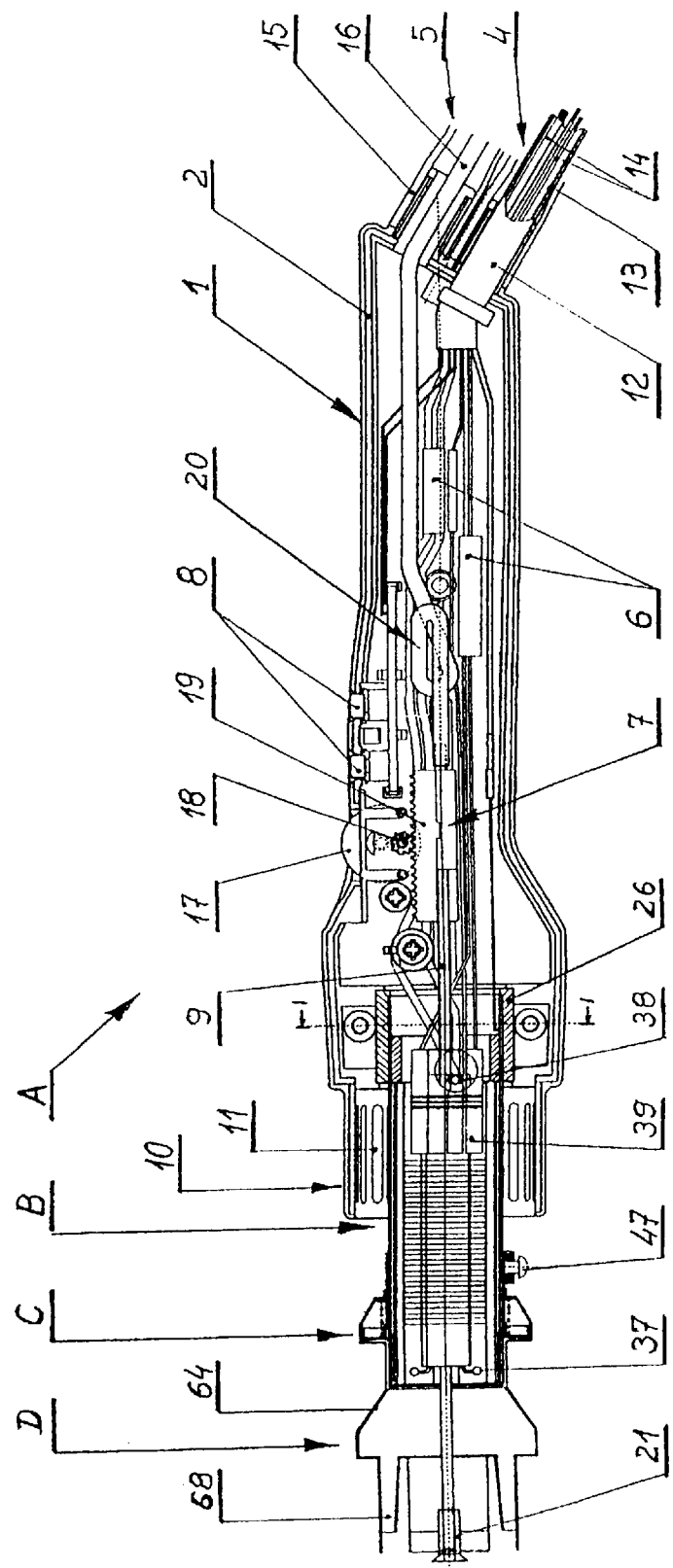
FIG. 1. is a cross sectional view of a heating head in accordance with the present invention.
Figure 2:
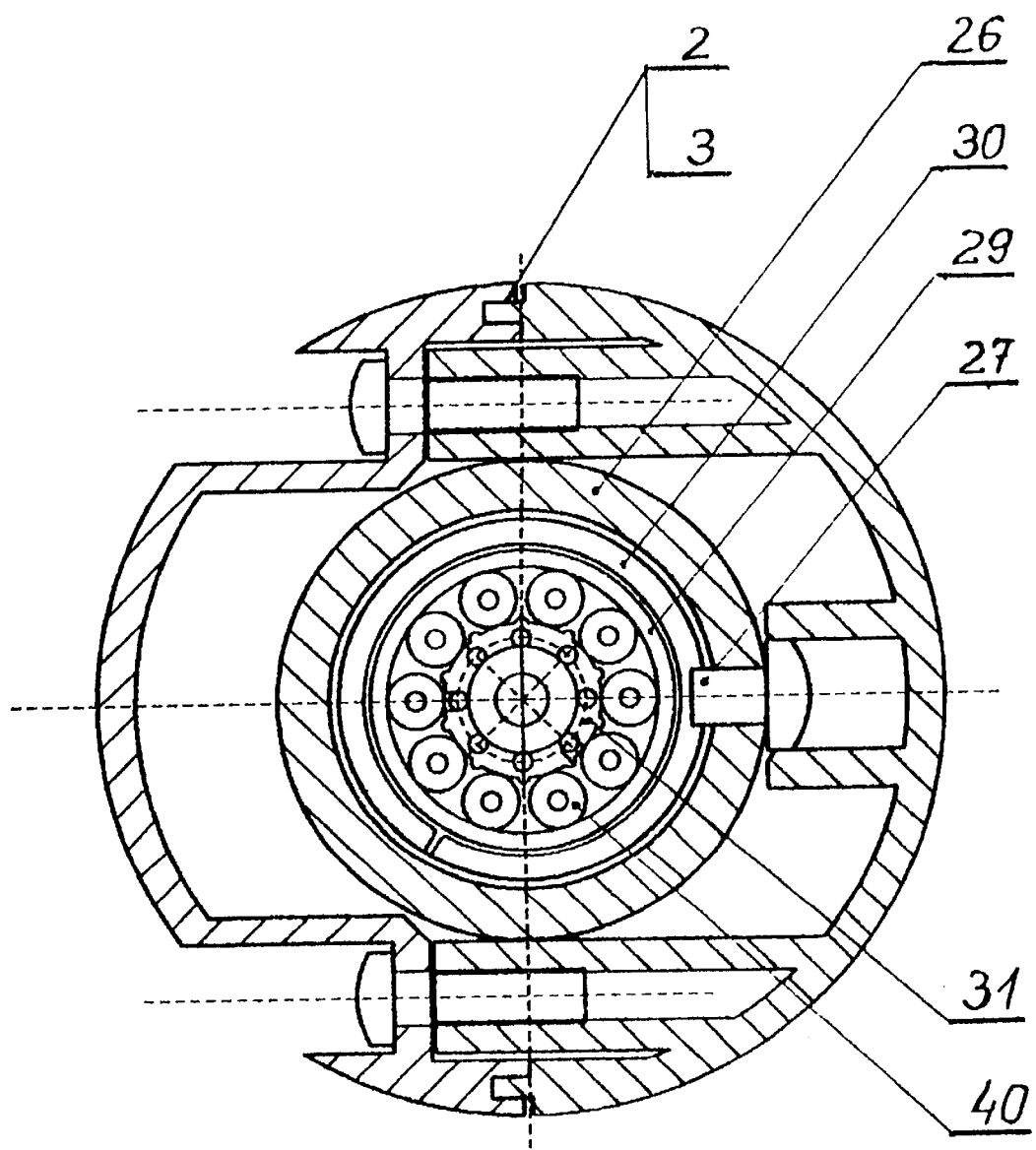
FIG. 2 is a cross sectional view of the heating head shown in FIG. 1 taken along the line 1—1 in FIG. 1.

The heating head for soldering and de-soldering of SMD surface mounted devices of the present invention, shown in cross-section in FIG. 1, is comprised of a handle portion A having mounted on its forward end heater subsystem B, to which nozzle quick connect mechanism C is mounted, and with heating nozzle D connected via such quick connect mechanism. The components of handle portion A are enclosed in housing 1, which is made of high temperature, static dissipative plastic. As shown in FIG. 2, housing 1 is comprised of two parts divided symmetrically along a central axis. The edges of the two parts of housing 1 have a groove 2 and corresponding to it tongue or step 3 similar to a clam shell style housing. When the two parts of housing 1 are closed, groove 2 and tongue or step 3 seal the housing 1 so that it is leak tight and assure that the handle A is rigid.

The top end of the handle A is sloped or angled inwardly, with electrical connection 4 and gas or air supply connection 5 extending therefrom. As shown in FIG. 1, by sloping or angling the top end inwardly, connections 4 and 5 are positioned so that they are angled slightly downwardly at their connection point in the top end of housing 1. Electrical connection 4 includes multi wire cable 12. Cable 12 is preferably comprised of an antistatic jacket 13 made of ESD silicon, inside of which are insulated electrical wires 14 of different diameters corresponding to their functions, including supply of power to the heater, control of subsystems supplying gas and vacuum and temperature measurements via thermocouples. Optionally, the opposite end of the electrical wire can include a detachable connection device so that the wire can be easily disconnected from the electric source when necessary. Gas or supply connection 5 is comprised of an outer tube 15 for supplying gas, preferably made of antistatic silicon tubing. Situated inside the outer tube 15 is thinner vacuum tube 16. Inside the housing 1, below connections 4 and 5 there are connectors for electrical connections 6.

Situated inside the central portion of the heating tool housing 1 is mechanism 7 for moving metal vacuum tube 9 up and down along the tool axis and two micro switches 8. The mechanism 7 for moving the vacuum tube 9 allows the position of the vacuum tube 9 to be moved laterally along the axis of the heating unit, while micro switches 8 allow for turning the hot gas and vacuum on and off, respectively. Mechanism 7 includes a digitally turning wheel 17 extending through an aperture in housing 1. Attached to wheel 17 is gear wheel 18, the teeth of which gear engage the teeth on the upper side of flat toothed bar or rack 19. Bar or rack 19 is permanently attached to metal vacuum tube 9, which extends from the bottom end of housing 1 and protrudes through apertures in the heater sub-assembly B and nozzle D. As wheel 17 is turned, gear 18 causes rack 19 to move along the axis of the handle A. The upper end of metal vacuum tube 9, which is located inside of the housing 1, is permanently attached to one end of flexible vacuum tube 16. As shown in FIG. 1, such end of flexible vacuum tube 16 is formed in a loop or pigtail 20, which allows flexible tube 16 to be displaced when vacuum tube 9 is moved laterally along the axis of the tool without such movement being restricted by connection with vacuum tube 16. Situated on the lower end of metal vacuum tube 9, extending beyond the housing 1, is removable vacuum cup 21, shown in partial cross-section in FIG. 3. Vacuum cup 21 is generally dome-shaped and is preferably made of antistatic silicon. A hole or aperture extends along its central axis so that the upper end of cup 21 can be for fitted the end of the vacuum tube 9, where it is held by friction. Molded stopping ring 22 is situated approximately halfway down the length of the hole to prevent the end of the vacuum tube 9 from extending beyond such ring 22 and possibly pushing out the bottom of the cup 21. Vacuum tube 9 with the vacuum cup 21 is used to hold SMD surface mount devices during placement and to lift an SMD device after de-soldering it from a PCB (printed circuit board).

Heater sub-assembly B is located behind the mechanism 7 and extends beyond the bottom end of housing 1 of handle A. Cylindrical protective shroud or covering 10 on housing 1 encircles at least a portion of the outer side of sub-assembly B to prevent accidental touching of the hot heater shroud 23 of sub-assembly B. Elongated slots or ventilation holes 11 parallel to the axis of the tool are also provided in covering 10 to ensure that sub-assembly B is sufficiently ventilated. As shown in FIG. 4, heater sub-assembly B includes a metal, cylindrical shroud or outer cover 23. Situated near the lower end of sub-assembly B on the outer surface of shroud 23 are a pair of preformed elongated out-dents or ridges 24, which, as explained in detail below, are used to aid in aligning the quick-connect mechanism C. End cup or grill 25 is secured across the lower end of sub-assembly B at the end of a shroud 23. End cup or grill 25 has a central hole to allow for protrusion of the vacuum tube 9, and a pattern of symmetrically spaced holes to allow for low resistance and uniform exit of the hot gas from the heater sub-assembly B.

Insulating ring 26, which is preferably made from fiberglass or other insulation, is secured over the upper end of the shroud 23 using a mounting screw 27, protruding outwards. Insulating ring 26 holds the heater sub-assembly B inside of housing 1, while mounting screw 27 protects against possible displacement, rotation, or other movement of heater sub-assembly B and shroud 23 in relation to housing 1. As shown in FIG. 4, an insulating thin wall tube 28, preferably made of artificial mica, is situated inside and adjacent to shroud 23. Insulating thin wall tube 28 separates shroud 23 from thin wall insulating tube 29, which is adjacent the inner side of insulating thin wall tube 28 and is preferably made of quartz or ceramic. Insulating tube 29 is secured in position and protected against displacement along axis by an insulating ring 30, made of artificial mica. In other words, the heater is inside the quartz or ceramic tube, which tube is inside of an artificial mica tube, and the ceramic or quartz tube is secured and disallowed from axial movement by a short ring made conveniently from artificial mica.

Figure 5A:
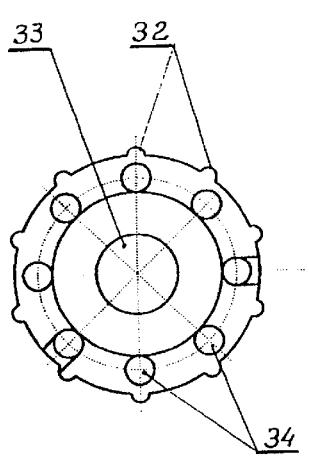
Figure 5B:
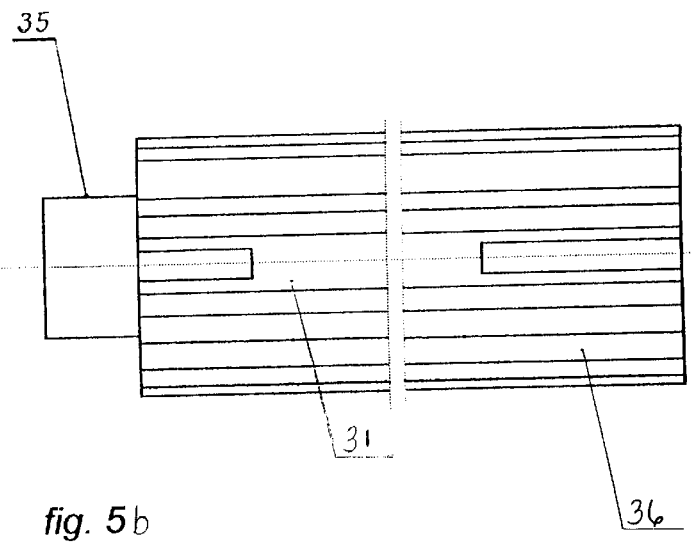
FIG. 5b is a side view of the heater core portion of the heater sub-assembly.

Located generally centrally inside insulating tube 29 is a ceramic rod 31, shown in FIGS. 5A and 5B. As shown in FIG. 5A, rod 31 is generally cylindrically shaped and has bosses 32 spaced on its outside surface. In addition, hole 33 is provided through the center of rod 31 through which vacuum tube 9 can extend. Rod 31 also has around the center hole 33 additional holes 34 placed symmetrically around central hole 33. As shown in FIG. 4, heating element 36 is wound around the rod 31 on the elongated bosses 32. Preferably, one supply wire for heating element 36 is pulled through one of the perimeter holes 34, while another supply wire is placed on top of rod 31. Near the lower end of rod 31, or near where it contacts the heater shroud end cup 25, there is placed an undercut 35. In the space created by undercut 35 front thermocouples 37 are placed. Preferably, front thermocouples 37 are pulled through consecutive perimeter holes 34. Thermocouples 37 are placed in such a manner that they are in the main gas stream and at the same time are not touching end cup 25 or metal heater shroud 23. In addition, back thermocouple 38 is connected at the upper end of the heater core in one of the perimeter holes 34. Back thermocouple measures the temperature of the rod 31 at the back and, in case of insufficient volume of gas flowing to the heater, signals the heater assembly to disconnect the power to the heater and protects it against damage or overheating.

Also located generally near the upper end of rod 31, between rod 31 and insulating ring 30, and between the heater core and heater shroud, is laminar flow equalizer 39. Flow equalizer 39 is comprised of several thin wall ceramic tubes 40 secured side-by-side around rod 31. Behind flow equalizer 39, on an inner part of a shroud 23, is a grounding wire 41 attached by welding or brazing. Flow equalizer 39 provides the heater with more uniform gas flow into the heater sub-assembly B.

Figure 7A:
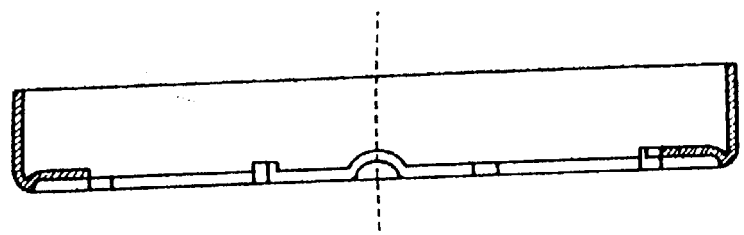
Figure 7B:
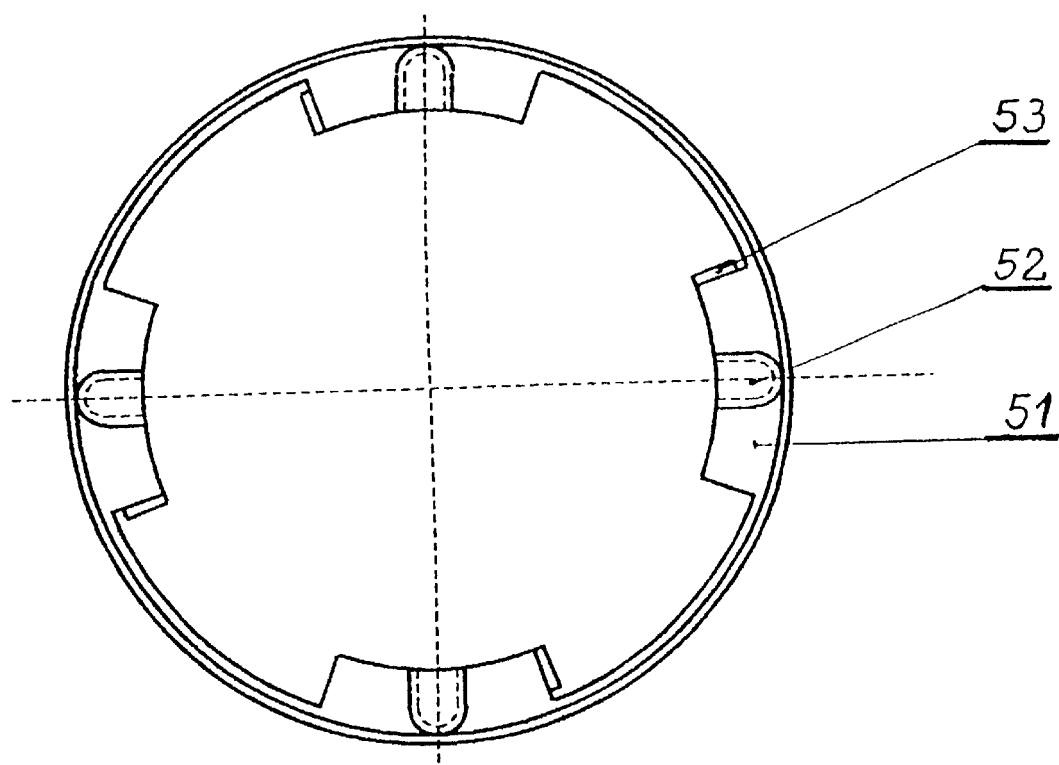

Quick connect attachment C is provided so that heater nozzles D can be quickly attached and removed from the heating head for use in soldering and desoldering SMD components having different sizes and shapes. Quick connect attachment D is comprised, as shown in FIGS. 6–7, of a cylindrically shaped sleeve portion 42 having an inside diameter matched or slightly larger than the diameter of shroud 23 of the heater sub-assembly B. In an upper part of the inner surface of sleeve 42 are pre formed indents 43, which correspond to pre-formed outdents 24 in shroud 23. Positioned in between indents 43 on sleeve 42, and extending vertically from the upper end of sleeve 42 are two cuts in sleeve 42, forming tong 44, which is part of the cylinder 42, between the cuts. Bracket 45, preferably made of metal and attached preferably by welding or brazing to the outside surface of sleeve 42 so that it is extending across both sides of the tong 44. Above the tong 44 the bracket 45 has preformed space in which there is a threaded hole or PEM-nut 46 of a type known by those skilled in the art. Via bracket 45 securing screw 47 is placed into the PEM-nut 46, pushing tong 44 inwardly against shroud 23 and thereby securing the quick connect C to heater sub-assembly B.

Outside cover 48 is permanently attached preferably by brazing or welding extending around the outer circumference of the lower end of sleeve 42. Cover 48 has a cylindrical lower section and is in the form of a truncated cone in the upper section. Ventilating holes 49 are spaced in the coned or conical section of cover 48, as shown in FIG. 6. Upper ring 50 is permanently attached along the bottom of the cover 48, and forms part of the locking mechanism of quick connect C. Upper ring 50 of a quick connect has at least two, and preferably four, pre formed wings or latches 51, shown in FIG. 7, which are perpendicular to the axis of sleeve 42. Each wing 51 has in the center an indent 52 for connecting to a heater nozzle D. In addition, one end 53 of each wing 51 is bent inwardly, which stops bottom ring 59 on heater nozzle D from rotating as will be shown.

Inside the upper ring 50, on the outer perimeter and at the bent wings 53, there is placed a spring 54, made conveniently from super high temperature steel alloy. Inside the cover 48 there is floating flanged ring 55, which is pressed downwardly by spring 54 against the four indents 52 and the bent wings 53 of upper ring 50 when the heater nozzle D is not connected. As will be described in more detail below, the wings 53 of the upper lock or ring 50 have press-ins and on one side are bent to prevent rotation of the nozzle beyond the position defined by the press-ins and press-outs on the nozzle ring. Floating ring 55 is placed with loose tolerance over the sleeve 42. The diameter of the ring 55 is slightly larger than a diameter of sleeve 42. A flange of a floating ring 55 is pressed by spring 54, which is under the cover 48. Spring 56 is separated from the cover 48 and from the flange of the floating ring 55 by insulating washers 57.

Figure 8A:
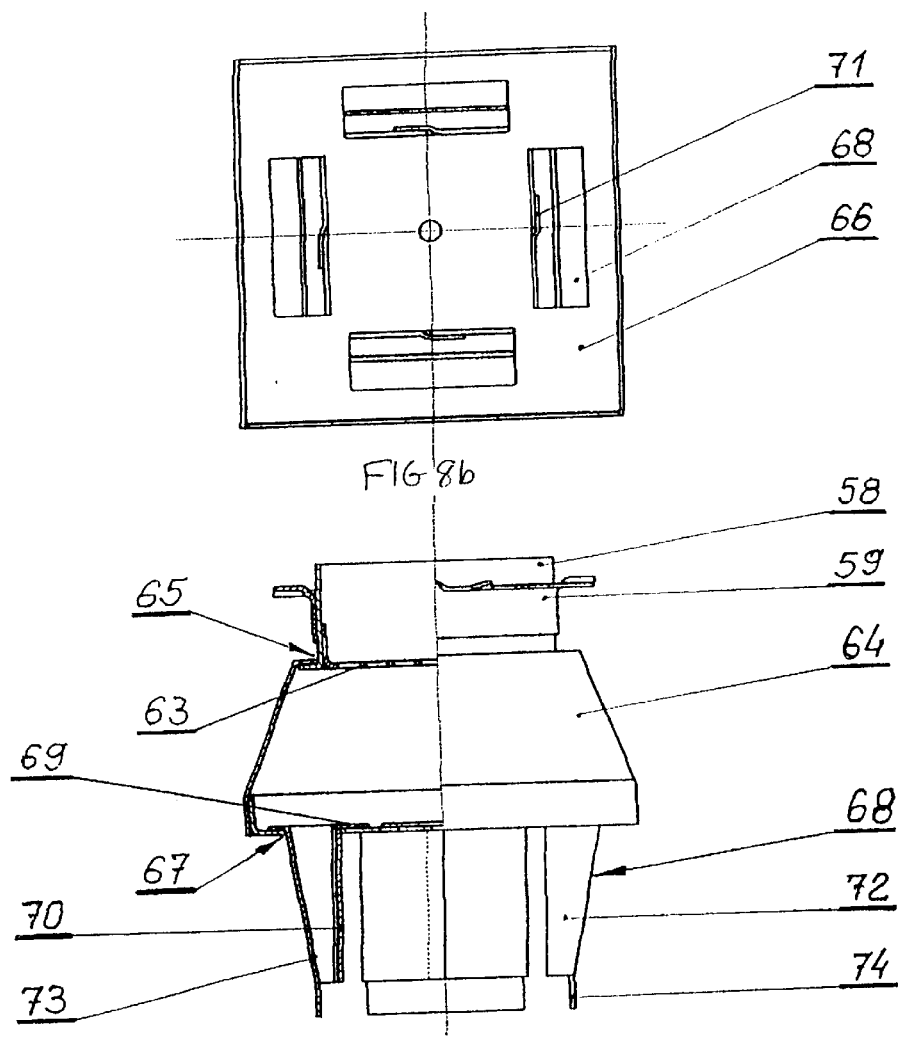
FIG. 8a is a partial cross-section of a preferred heating nozzle in accordance with the present invention.
Figure 9A:
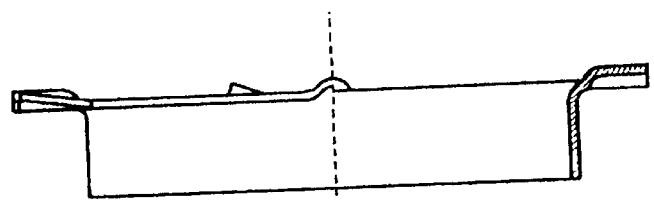
Figure 9B:
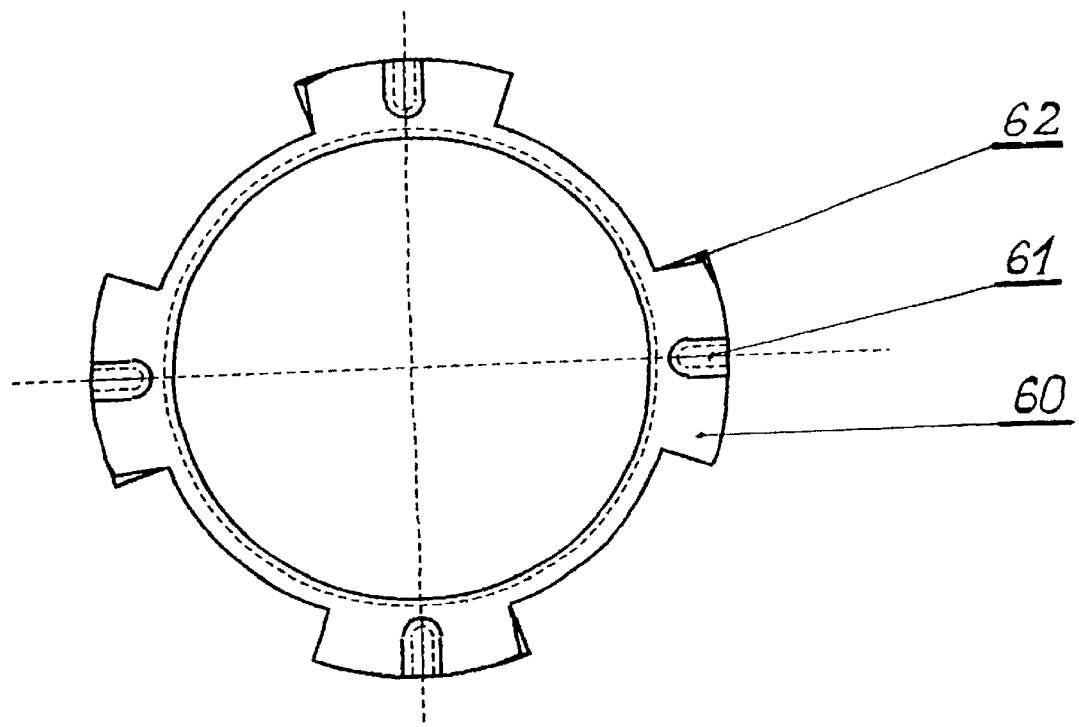

Heater nozzle D, shown in FIGS. 8 and 9, has a cylinder or inlet ring 58, of the same diameter as the sleeve 42 of quick connect C. Below the top edge and on the outside surface of cylinder 58 there is permanently attached by welding or brazing a bottom ring or locking ring 59, which is actually the lower ring portion of the quick connect mechanism. Bottom ring 59 has four wings 60 perpendicular to the axis of cylinder 58. Wings 60 are shaped and sized similarly to wings 51 on upper ring 50. As shown in FIG. 9, each wing 60 has in its center an outdent 61, matching indents 52 on upper ring 50, and has on the leading or attacking side of wing 61 a slight bend upwards, facilitating engagement of upper ring 50 with bottom ring 59.

Situated inside the lower or bottom portion of cylinder 58 there is perforated element or screen 63. Screen 63 has a central hole through which vacuum tube 9 can extend, and in addition has a plurality of evenly spaced holes which equalize the flow of hot gas released through the nozzle. Cylinder 58 is flanged outwardly at the bottom, and the flange is used to connect cylinder 58 permanently by welding or brazing to a mixing chamber 64 of the nozzle.

In one embodiment, as shown in FIG. 8, chamber 64 has shape of a truncated pyramid having a rectangular or square bottom. Input hole 65 is located centrally on the top surface of chamber 64, into which flanged cylinder 58 is fitted and secured. Chamber 64 is enclosed on the bottom by bottom plate 66, which plate 66 has a central hole for protrusion of vacuum tube 9. In addition, plate 66 contains four symmetrically located rectangular holes 67, inside which end nozzles 68 are secured. Each end nozzle 68 is preferably made by folding a pre-cut, thin, sheet metal element, which resembles irregular truncated pyramid. Situated on the upper or wider end of the end nozzle 68 are flanges 69, which are permanently attached to bottom plate 66, also preferably by welding or brazing. Inner wall 70 of the end nozzle 68, shown in FIG. 8, is parallel to the major axis of the heating nozzle D and has a fold 71. Side walls 72 of end nozzle 68 have shape of a trapezoid which is narrower at the bottom. Outer wall 73 of end nozzle 68 is not parallel to the major axis of the heating nozzle D, and is shown being slanted slightly inwardly in FIG. 8. Outer wall 73 is slightly longer that inner wall 70 or side walls 72, so that end 74 can direct the flow of gas from the heating nozzle D as desired. End 74 can be an extention of outer wall 73 or can be bent parallel to the axis of a heating nozzle D. Although the example shown in FIG. 8 has four end nozzles 68, the exact number of end nozzles 68, their location on the bottom plate 66 and shape of ends 74 will depend for which type of SMD device or integrated circuit the nozzle D is intended to be used with.

Operation of the invention will now be described with reference to FIGS. 1–9. The heating head for soldering and desoldering SMD devices works on the principle of heat transfer to the soldered media via hot gas. Such gas can be air or an inert gas if limiting of oxygen is desired. Cold gas is supplied to the heating head via gas inlet 5 through gas tubing 15. Such gas flows inside and through housing A and reaches heater sub-assembly B. Upon reaching heater sub-assembly B, the gas passes through laminar flow equalizer 39, where flow velocity and volume is averaged and equilized. The gas then flows through a heating element 36 where it is heated to a temperature required by the soldering process. While heater sub-assembly B generates a lot of heat and gets hot, to diminish heat loss to the atmosphere and to increase heater efficiency, heating element 36 is placed on elongated bosses 32 on rod 31, to obtain minimal contact surface. On the outside heating element 36 is surrounded by quartz or ceramic tube/spacer 29, which is further separated from heater shroud 23 by a artificial mica tube 28. To protect against damage of housing 1 of handle A by heat, housing material 1 is equipped with thermally insulating tubing 26 made of fiberglass. Heater sub-assembly B is held inside handle A via insulating tubing 26.

Gas temperature is precisely controlled by reading or measuring the gas temperature via front end thermocouples 37 placed at the front of a heating rod 31. Due to the undercut 35 in rod 31, front end thermocouples 37 are in a hot gas stream or flow and at the same time do not touch the heater shroud 23 or end cup 25. Exact measurement of gas temperature allows for supply of an electrical energy to a heating element 36 by a separate controller in the amount required to reach the desired, pre-set temperature. The temperature of the heater core is precisely controlled by measurements taken from the top end back thermocouple 38. If gas flow is restricted or too small a volume of gas is flowing into the heating head, the heater core 31 will become too hot and the supply of an electrical energy to a heating element 36 will be automatically turned off.

Via end cup 25 hot gas enters heating nozzle D through a sleeve 58. Hot gas must pass through perforated element 63 in heating nozzle D, which equalizes further gas flow. The gas then enters chamber 64, where such gas is divided and enters end nozzles 68. The shape of end nozzles 68 is such that it causes reduction of volume and increase in speed of the gas stream coming out of the end nozzles 68. Finally, the end nozzle end 74 directs gas stream to the soldered connections.

Figure 3:
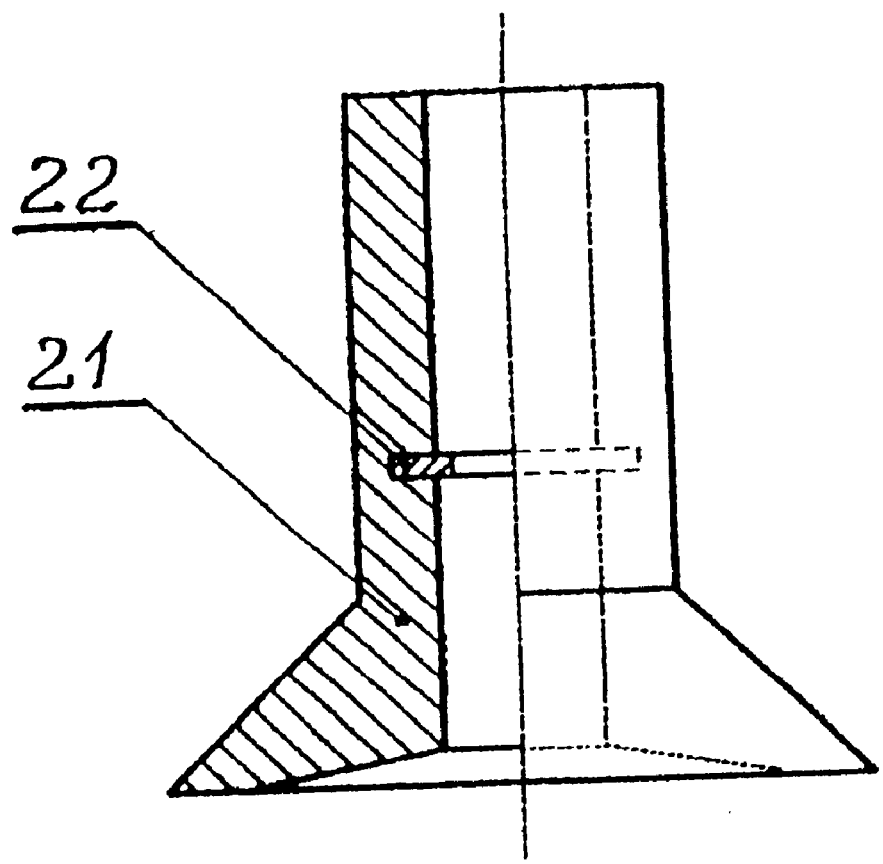
FIG. 3 is a side view of the vacuum cup of the present invention with a partial cross-section.

To solder an SMD device, one places a heating nozzle D above the SMD device in such a way that the end nozzles 68 and their ends 74 are directly above or slightly on the outside of the SMD device connections. During de-soldering, after positioning the heating head with heating nozzle D above the SMD device, an operator using a pushbutton 8 in housing A turns on a vacuum pump and lowers vacuum tube 9 having cup 21 on its end downwardly by rotating wheel 17, which touches and engages with the SMD device. This allows the SMD device to be lifted from a printed circuit board after de-soldering. As shown in FIG. 3, vacuum cup 21 has imbedded a stopping ring 22, which prevents the end of vacuum tube 9 from protruding through vacuum cup 21 and assures proper contact of vacuum cup 21 with the SMD device. Mechanism 7 for moving vacuum tube 9 allows for precise positioning of a vacuum cup 21 on the SMD device. In addition, mechanism 7 also allows the position of vacuum cap 21 to be corrected in case of an SMD device having a slightly different height, which is often the case. A tool for inserting and removing the vacuum cup can also be used. Said tool comprises generally an elongated handle portion having a hook-like end portion and a small bar protruding from the other end. Said tool is used to grab the vacuum cup without having to manually grip the cup.

After the heating head has been placed in position above the SMD device to be de-soldered, and vacuum cup 21 has engaged the SMD device, gas supply and electrical energy is turned on via second push button switch 8. At this time, evenly distributed, non contact heating of soldered connections takes place, protecting against overheat the entire SMD device. When the solder reaches its melting point, the heating head is lifted with the SMD device and heating is turned off using the same push button 8. In case semi-automatic controllers with profiling are used, gas temperature is changed gradually in several time zones, with the last zone being a cooling zone. In case of de-soldering, the vacuum tube 9 is used to connect vacuum cup 21 with the SMD device, which is lifted from the circuit board after the soldered connections have reached their melting point or temperature. After the cooling zone is finished, an operator places a tray under heating head and SMD device hanging on the vacuum tube and vacuum cup and releases the SMD device onto a tray by pressing the first push button 8. The heating head can be hand held by the operator, who places or replaces an SMD device, or may be placed in an arm of a semi automatic or automatic rework system. In such a case, movements and temperature profiling can be controlled from a separate controller.

To protect the operator against accidental touching of the hot heater sub-assembly B, housing 1 has a protective shroud 10 over sub-assembly B. Elongated holes 11 in the shroud help heat dissipation and protect the shroud against overheating. In addition, all elements of a heating head are protected against accumulation of static electricity, which could damage sensitive IC's. Plastic components are made of antistatic or static dissipative compounds, and metal parts are all grounded via shroud 23 surrounding heater and by being a part of heater sub-assembly B and via grounding wire 41.

Heating nozzle D is matched to the particular size and type of a SMD device. Different size of an IC (SMD) will require changing of a heating nozzle D. Maintaining similar construction there were constructed many heating nozzles D having variety of sizes and types. For quick change of a heating nozzle D on the heating sub-assembly B, there is placed and attached quick connect C. To assure always the same position of a nozzle D, shroud 23 of the heater sub-assembly B has two press-outs 24, and the sleeve 42 of quick connect C has corresponding two press-ins 43. Secured connection of quick connect C to shroud 23 is obtained by pressing tong 44 of the sleeve 42 against shroud 23 by tightening screw 47. Such solution protects the shroud 23 against damage by screw 47. Quick connection of a heating nozzle D is realized by insertion of upper part of a sleeve 58 inside the lower ring 59 of the quick connect C, and the by rotation of the nozzle D clockwise until it stops. During the twisting motion, a match of the dent (formed part) of wing 61 with a dent (formed part) of another wing 52, and positioning of a nozzle D. Further twisting is not possible because the edge 60 with an attacking bent 62 stops on the bent 53 of the wing 51. Spring 56 pushes downwardly on the flanged ring 55 and stabilizes the connection, making it rigid.

Figure 10:
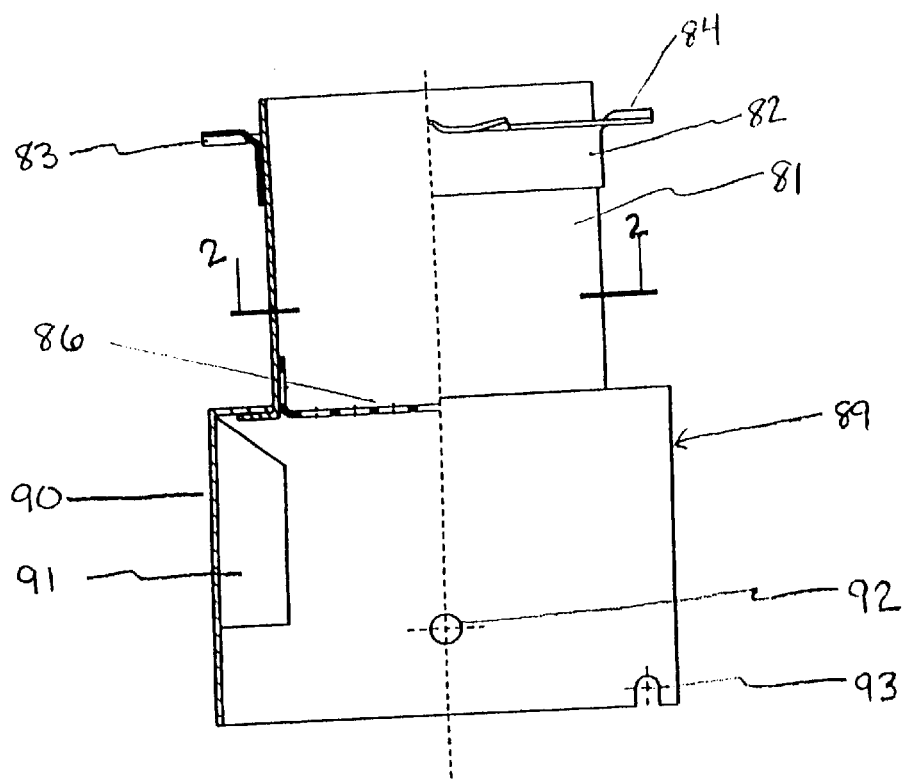
FIG. 10 is a partial cross sectional view of another preferred heating nozzle of the present invention.
Figure 11:
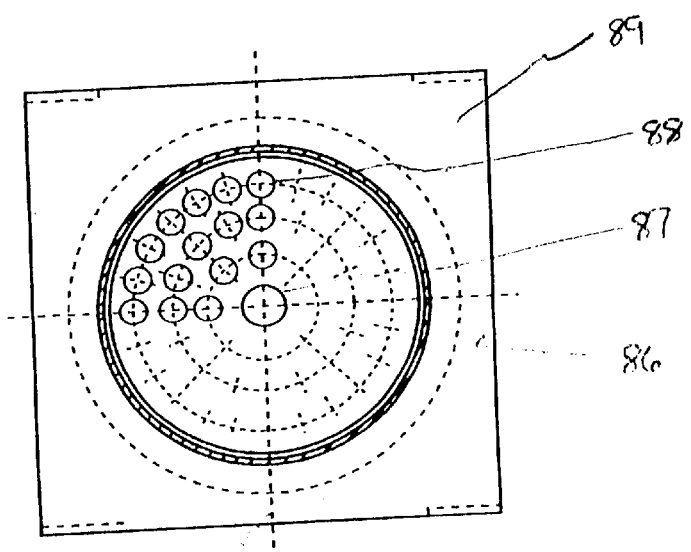
FIG. 11 is a cross sectional view of the heating nozzle taken along the line 2—2 in FIG. 10.

FIGS. 10 and 11 illustrate an example of another preferred heater nozzle for use with the heater head assembly of the present invention in soldering and desoldering surface mounted devices (SMD's). Similar to nozzle D described above, such nozzle is comprised of a cylinder or inlet ring 81, which essentially acts as a mini chimney for the nozzle having a diameter corresponding to fit to connecting elements of the heating head. Permanently attached below the upper edge or ridge of cylinder 81 is a bottom or locking ring 82. Locking ring 82 has in its upper part a preformed and bent or profiled out portion perpendicular to the axis of the nozzle containing at least two, and preferably four, wide wings comprising hooks or latches 83. The hooks or latches are shaped to match corresponding connecting elements of the heating head, shown in FIG. 3. Centrally located on each hook or latch 83 are impressions 84, and guiding bendovers 85 are formed to the top on the attacking edge of each hook or latch 83.

Located inside of the lower part of cylinder or min chimney 81 is perforated element or end cup 86. As shown in FIG. 11, element 86 has a centrally located hole 87, and rows of equally separated flow holes 88 facilitating flow equalization of heated working gas. The bottom of mini chimney 81 has a collar or flange profiled out at a right angle, through which it is permanently connected with the top wall of chamber 89. Chamber 89 is generally in the shape of a rectangular box made by folding a sheet metal pre-form, where side walls 90 are connected to each other via 90 degree sheet metal corners 91. Overfolds 91 are shorter than the side walls 10 by the value "a," equal to at least the height of the SMT device to which the attachment is being used. The exact dimensions of the chamber 90 will depend on the type of SMT device to which the attachment is being used. Located on each side of wall 90 there is a central, ventilating hole 92, and at the bottom of each wall, close to a corner of the wall 90 there is an undercut for ventilation 93.

As indicated above, the diameter of the mini chimney and the hooks or latches, having a central impression, fit to connecting elements of the heating head. The dimensions of the chamber depend on the selected SMT solid state device type. The overfolds are shorter from side walls by the value of "a," equal at least to the height of the selected SMT solid state device.

The attachment to the heating head used to desolder and solder SMT devices of BGA type, in accordance with the specification, has many new and important utility features. The shape of the latching elements simplifies the changing of the attachments and secures their positioning. In addition, the location of the perforated element allows the parameters of the working gas to be solidified. The proper location of the holes and circulation cut-ins also finely regulates the working parameters.

The heating head described in this patent has many novelties and important design features and advantages, resulting in a heating device with relatively a low manufacturing cost, high durability, reliability and excellent performance characteristics. For example, connection of the electrical wires and gas lines on the angle at the top end of the tool and not along the tool axis reduces cable pull sideways and extends the life of the connections. In addition, application of custom, multi-wire cable having wires of different gauges allows for reduction in overall cable diameter. This custom wire arrangement eliminates the need of pulling the wires inside the gas tubing.

Also improved is the construction of the gas line connectors with the tool and control unit, which have been made leak resistant. Another improvement is the attachment of the heater shroud to the heating head housing via an insulating ring, which prevents the plastic housing from overheating and essentially makes the plastic housing non destructible by heat from the heater sub-assembly. In addition, the positioning of the laminar flow equalizer in front of the heater helps create more uniformity of the hot air stream, which improves overall performance. The laminar flow equalizer also makes the hot gas leaving the heater assembly exceptionally uniform and protects the heater from accidental damage due to uneven heat distribution on the surface of a heating element.

The ability of the present device to provide increased uniformity or even heating makes this heating head very useful for soldering small size and delicate SMD devices. Installation of the back thermocouple protects against heater damage, and placement of the control thermocouple up front in the air stream makes such air stream temperature control quite accurate.

The quick connect feature of the present invention is a novelty as well. Accurate positioning of quick connect on the heater shroud is assured due to matching press outs on the cylinder of the quick connect and heater shroud. In addition, attachment of the quick connect to the heater shroud via a vertically positioned screw is convenient and is a novelty. Cold forming of the positioning indents and out dents also makes exchanging nozzles very simple and assures precise positioning. Nozzles are suited for SMD devices of types QFP, SOIC, SOL and PLCC.

While the present invention has been described at some length and with some particularity with respect to the several described embodiments, it is not intended that it should be limited to any such particulars or embodiments or any particular embodiment but it is to be construed view of the prior art and to effectively encompass the intended scope of the invention.

I claim:

1. A heating head for soldering and desoldering SMD Surface Mounted Devices from a substrate comprising:
   (a) a housing having a top end and a bottom end, said top end angled inwardly so that it is not along the central axis said housing;
   (b) a heater sub-assembly mounted to and extending beyond the bottom end of said housing for heating a hot gas supply;
   (c) aheater nozzle attached at least temporarily to the heater sub-assembly so as to receive the hot gas supply flowing from said heater sub-assembly; and
   (d) a vacuum pickup means extending through said housing, heater sub-assembly, and heater nozzle, said vacuum pickup means comprised of a metal vacuum tube attached to a vacuum line on one end and having a vacuum cup on the other end for holding and lifting an SMD device.

2. A heating head for a soldering and desoldering device in accordance with claim 1 wherein said housing comprises a clam shell style housing, and wherein extending into the angled top end of the housing there is an electrical inlet comprised of a flexible, multiwire cable inside which there are electrical insulated wires of different gauges, and a gas inlet comprised of an outside tubing which supplies gas and inside which there is a smaller vacuum tubing.

3. A heating head for a soldering and desoldering device in accordance with claim 1 further comprising a mechanism for laterally moving said vacuum pickup means along the axis of the heating head.

4. A heating head for a soldering and desoldering device in accordance with claim 3 wherein said mechanism for laterally moving the vacuum pickup means along the axis of the heating head further comprises a digitally adjustable turning wheel extending through an aperture in said turning wheel connected to a gear wheel the teeth of which are engaging a toothed bar permanently attached to said vacuum tube.

5. A heating head for a soldering and desoldering device in accordance with claim 1 wherein said vacuum cup is made from antistatic silicon and is in the shape of a dome, and having an aperture extending along its central axis in which the lower end of the vacuum tube is inserted and held by friction and inside of which there is integrally attached an imbedded stopping ring.

6. A heating head for a soldering and desoldering device in accordance with claim 1 wherein the upper end of said heater sub-assembly is secured extending beyond the bottom end of the handle housing via an insulating ring and screw arrangement.

7. A heating head for a soldering and desoldering device in accordance with claim 1 wherein said heater sub-assembly is covered partially by a protective shroud integrally attached to the housing, said protective shroud having ventilation holes to provide air ventilation to the heater sub-assembly.

8. A heating head for a soldering and desoldering device in accordance with claim 1 wherein the heater sub-assembly includes a cylindrical metal cover having an inner and outer end and a perforated end cup having a pattern of symmetrically spaced holes so as to provide uniform exit of hot gas from said heater sub-assembly secured over the outer end, and a ceramic heater rod secured inside the cover.

9. A heating head for a soldering and desoldering device in accordance with claim 8 in which located on the outer surface of the ceramic heater rod are a plurality of spaced apart elongated bosses on which a heating element is wound.

10. A heating head for a soldering and desoldering device in accordance with claim 8 wherein said heater rod has an undercut portion at the end closest the end cup; wherein a pair of thermocouples are located in said undercut portion so that they are in the main gas stream; wherein a back thermocouple is located near the back end of the rod; and wherein a grounding wire is permanently attached on the inner surface of the cover.

11. A heating head for a soldering and desoldering device in accordance with claim 8 in which said metal cover of the heater sub-assembly contains two pressed out elongated out-dents near the outer end of said cover for receiving a heater nozzle attachment means.

12. A heating head for a soldering and desoldering device in accordance with claim 8 in which the ceramic rod is situated inside a quartz or ceramic insulating tube, and situated between said insulating tube and outer cover is a second insulating tube of artificial mica.

13. A heating head for a soldering and desoldering device in accordance with claim 8 in which said ceramic heater rod further comprises a central aperture through which said vacuum tube may extend.

14. A heating head for a soldering and desoldering device in accordance with claim 13 in which said ceramic heater rod further comprises a plurality of apertures spaced symmetrically around said central aperture.

15. A heating head for a soldering and desoldering device in accordance with claim 8 in which a laminar flow equalizer is secured around the top end of the rod, said flow equalizer comprised of a plurality of ceramic tubes secured side-by-side around the ceramic heater rod so as to provide a more uniform gas flow into said heater sub-assembly.

16. A heater sub-assembly for a heater head used for soldering and desoldering SMD Surface Mounted Devices from a substrate comprising a ceramic heater rod for heating a hot gas supply mounted to and extending beyond the bottom end of a handle housing, said sub-assembly including a laminar flow equalizer secured around the top end of the heater rod, the flow equalizer being comprised of a plurality of ceramic tubes secured side-by-side around said ceramic heater rod to provide a more uniform gas flow into said heater sub-assembly.

17. A heater sub-assembly for a heater head used for soldering and desoldering SMD Surface Mounted Devices from a substrate in accordance with claim 16 wherein the heater sub-assembly additionally includes a cylindrical metal cover having an inner and outer end and a perforated end cup having a pattern of symmetrically spaced holes so as to provide uniform exit of hot gas from said heater sub-assembly secured over the outer end, and a ceramic heater rod secured inside the cover.

18. A heater sub-assembly for a heater head used for soldering and desoldering SMD Surface Mounted Devices from a substrate in accordance with claim 17 wherein said heater rod has an undercut portion at the end closest the end cup; wherein a pair of thermocouples located in said undercut portion so that they are in the main gas stream; wherein a back thermocouple is located near the back end of the rod; and wherein a grounding wire is permanently attached on the inner surface of the cover.

19. A heater sub-assembly for a heater head used for soldering and desoldering SMD Surface Mounted Devices from a substrate in accordance with claim 16 wherein the upper end of said heater sub-assembly is secured extending beyond the bottom end of the handle housing via an insulating ring and screw arrangement.

20. A heating head for a soldering and desoldering device in accordance with claim 11 in which a heater nozzle is attached to the heater sub-assembly by a quick connect mechanism, said mechanism comprising a sleeve portion with a first and second end, with one or more indents on the surface of said sleeve portion situated near said first end, said indents corresponding to the out-dents on the heater shroud, and additionally there is permanently attached to the sleeve on the first end a clamp for receiving a mounting screw, and below said mounting screw on the outer surface of the sleeve there is permanently attached a housing which is cylindrical in its lower part and conical at its upper part, and at the lower edge of said housing there is permanently attached a ring having at least two wings extending perpendicularly from said housing, and wherein inside said housing is a movable ring, said ring oriented to press onto preforms of a bottom lock ring on said heater nozzle to the wings of an upper ring via a spring, while at the same time said wings of the upper ring are matched with the wings of the lower ring.

21. A heating head for a soldering and desoldering device in accordance with claim 20 in which said heater nozzle is comprised of a cylindrical sleeve portion having an upper and lower end and the same diameter as the sleeve portion of said quick connect mechanism, said bottom locking ring secured below the upper edge of the sleeve portion of the nozzle, a mixing chamber secured to the lower end of said sleeve portion, said mixing chamber in a shape of a truncated pyramid with a rectangular bottom, said bottom having a small central hole and symmetically located rectangular holes in which the end nozzles are permanently secured, and a screen having a central hole and a plurality of evenly spaced holes surrounding said central hole situated inside the lower end of said cylindrical sleeve portion.

22. A heating head for a soldering and desoldering device in accordance with claim 21 wherein said end nozzles are comprised of an inner wall parallel to the axis of the heating nozzle, a pair of side walls having a trapezoidal shape and narrower on the bottom, and an outer wall which is longer than the inner and side walls and angled inwardly towards said inner wall, said outer wall having a tong on its lower end for directing the flow hot gas.

23. A heating head for a soldering and desoldering device in accordance with claim 22 wherein said end nozzles and mixing chamber are made by folding a flat pattern made of thin stainless sheet metal.

24. A heating head for a soldering and desoldering device in accordance with claim 1 wherein the housing for the handle is made in two halves from an antistatic, thermal resistant material with the edges of both sides of said housing secured together with a tongue and groove arrangement.

25. A heating head for a soldering and desoldering device in accordance with claim 2 wherein the electrical connection cable has an outside jacket comprised of an antistatic material which is an ESD material, and wherein the outer tubing—supplying gas has antistatic properties and is also made out of ESD material.

26. A heating head for a soldering and desoldering device in accordance with claim 3 wherein said mechanism for laterally moving said vacuum tube comprises a wheel extending through an aperture in the handle housing, said wheel connected to a gear which transfers the motion to a rack capable of movement along the axis of the handle, and where said rack is permanently attached to the vacuum tube, and wherein the upper end of said vacuum tube is permanently attached to an end of a flexible vacuum tube, said flexible vacuum tube forming a pigtail loop inside the housing to allow for axial movement of the vacuum tube without pinching the flexible tube.

27. A heating head for a soldering and desoldering device in accordance with claim 6 wherein the insulating ring is made from fiberglass and is placed over the upper end of the cover and secured using a screw so that the said assembly is fixed and not allowing for displacement nor rotation of said heater sub-assembly in relation to a housing.

28. A heating head for a soldering and desoldering device in accordance with claim 1 wherein inside a heater core of the heater sub-assembly there is a central hole and perimeter holes placed around a central hole.

29. A heating head for a soldering and desoldering device in accordance with claim 10 wherein the front thermocouples are located in an undercut in the lower part of the heater core, and where the thermocouples are fed through consecutive perimeter holes in the core and are placed in such manner that they are in the hot gas stream and at the same time are not touching the end cup.

30. A heating head for a soldering and desoldering device in accordance with claim 9 wherein the heater core with a heating element is covered by a thin wall tubing made of quartz or ceramic, and wherein between said thin wall tubing and shroud there is an insulative tubing made of artificial mica, and where said tubing is fixed in a position and prevented from movement along the axis by an insulative ring made of artificial mica, which is placed at the end of the cover.

31. A heating head for a soldering and desoldering device in accordance with claim 15 wherein said laminar flow equilizer is made of ceramic tubes filling the space between the end of the heater core and the cover.

32. A heating head for a soldering and desoldering device in accordance with claim 20 wherein in the part of a wall of a cover which is conical there are ventilating holes.

33. A heating head for a soldering and desoldering device in accordance with claim 20 wherein the wings of the upper ring of a lock of the quick connect mechanism has in the center a preformed indent and at the edge a blocking bend, and a wing of a bottom ring has in a center preformed out-dents matching the preformed indent and an attacking edge bent upwards which stops at said bend.

34. A heating nozzle, which attaches to a hot gas aparatus for soldering and desoldering SMD (Surface Mounted Devices) comprising an inlet ring, having an upper and lower portion, wherein in the upper portion and on an outside surface has permanently attached a lock ring, said lock ring having a flanged edge which has at least two wide wings, which have in a center preformed embosses and on one end, facilitating engagement bends, facing upwards on each of the wings, and inside of an inlet ring in the bottom part there is a perforated end cup, which has a central hole and other symmetrically holes around said central hole, to facilitate gas flow, and wherein said inlet ring has on its bottom a flange facing to the outside which permanently connects an input ring to a nozzle chamber, which has a shape of a truncated pyramid and where the chamber is created by a folding thin wall, sheet metal pattern and where side walls of of a chamber are permanently connected with one another via small sheet metal folds, and where on each side wall there is a ventilating hole in the center, and on the bottom of each wall, close to a corners of said chamber there is a ventilating notch.

35. A heating nozzle in accordance with claim 34 wherein the diameter of said inlet ring and wings, which have preformed boss in a center, are matching the elements of a quick connect attached to a heating head.

36. A heating nozzle in accordance with claim 35 herein the dimensions of a bottom part of a chamber is dependant on the dimensions and a specific kind of a SMD device.

37. A heating nozzle in accordance with claim 35 additionally comprising extensions that are longer than the other walls of an end nozzle by a lengths "a" which is equal or greater than a height of an integrated SMD device.

* * * * *